Sept. 17, 1935.  J. E. PADGETT  2,014,632
SYNCHRONIZING CLUTCH FOR TRANSMISSION GEARS
Filed Sept. 27, 1932  6 Sheets-Sheet 1
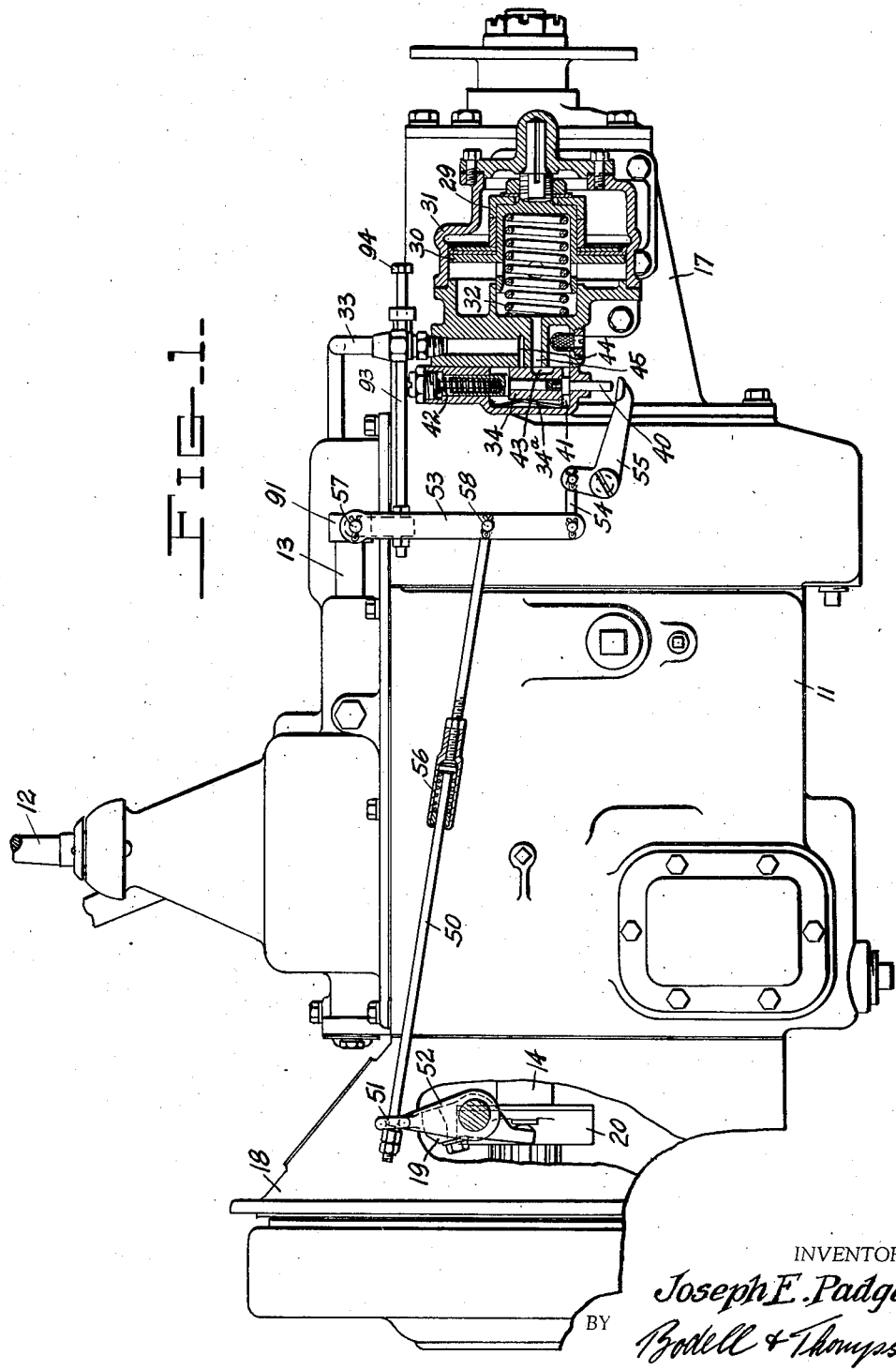
INVENTOR:
Joseph E. Padgett,
BY Bodell & Thompson
ATTORNEYS.

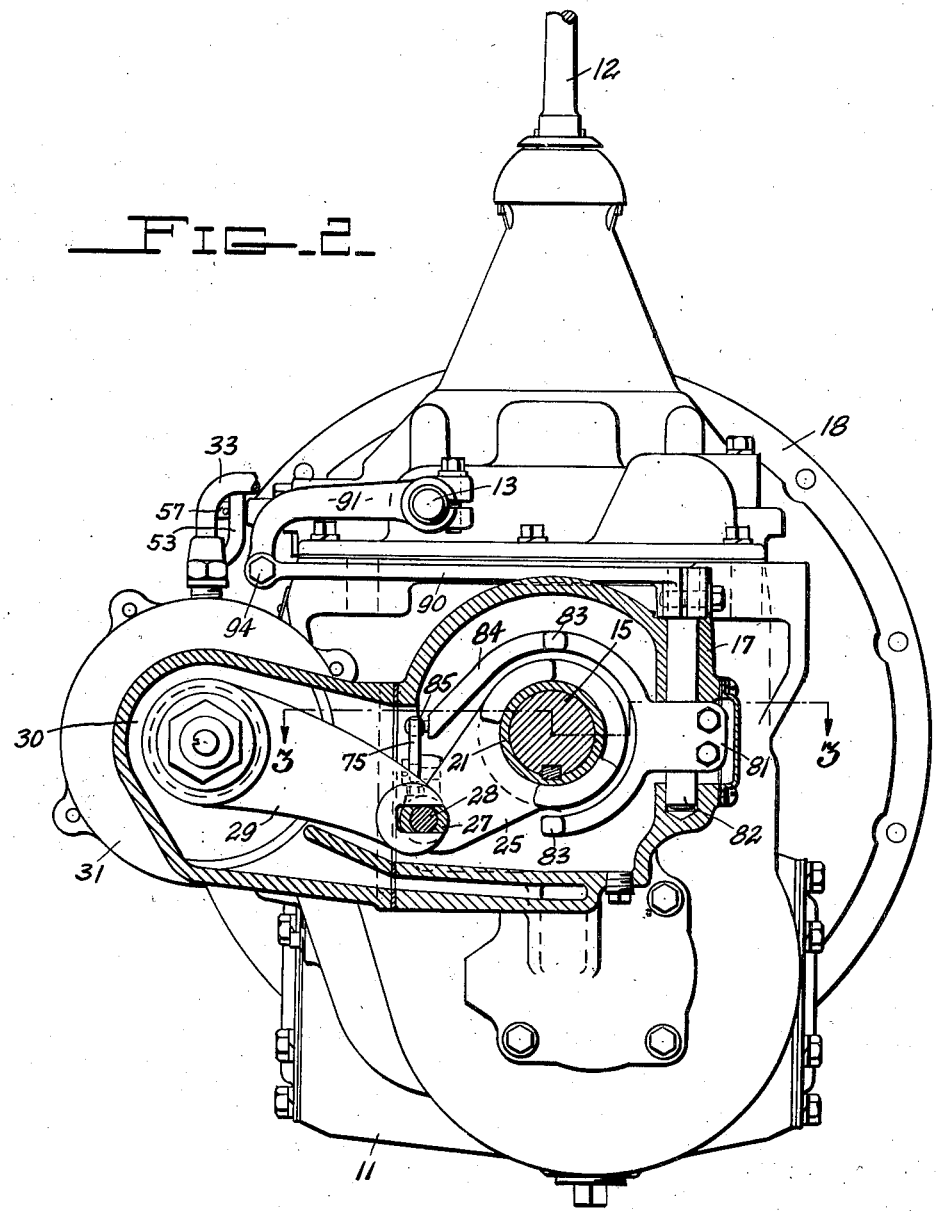

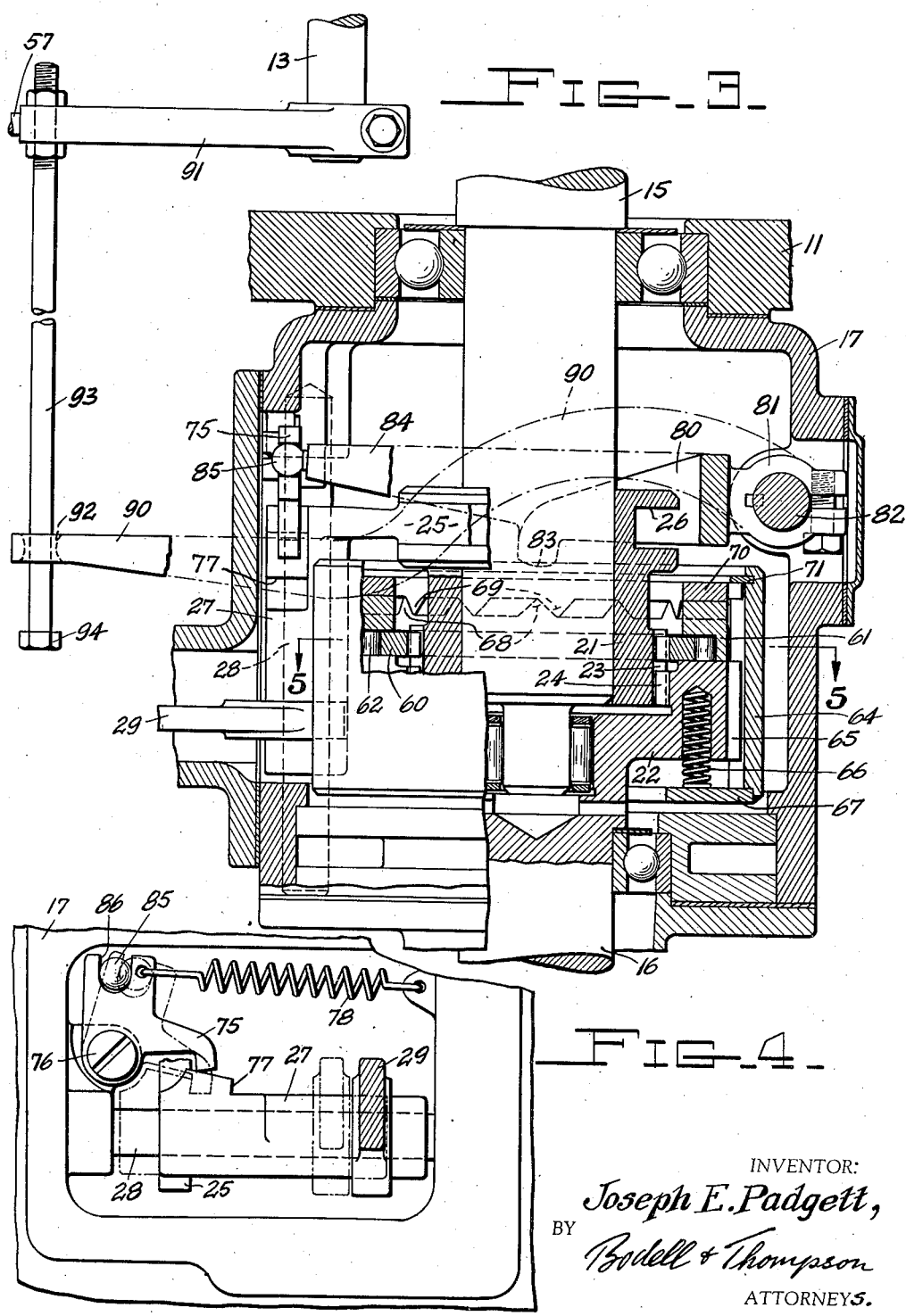

Sept. 17, 1935.   J. E. PADGETT   2,014,632
SYNCHRONIZING CLUTCH FOR TRANSMISSION GEARS
Filed Sept. 27, 1932   6 Sheets-Sheet 4

INVENTOR:
Joseph E. Padgett,
BY Bodell & Thompson
ATTORNEYS.

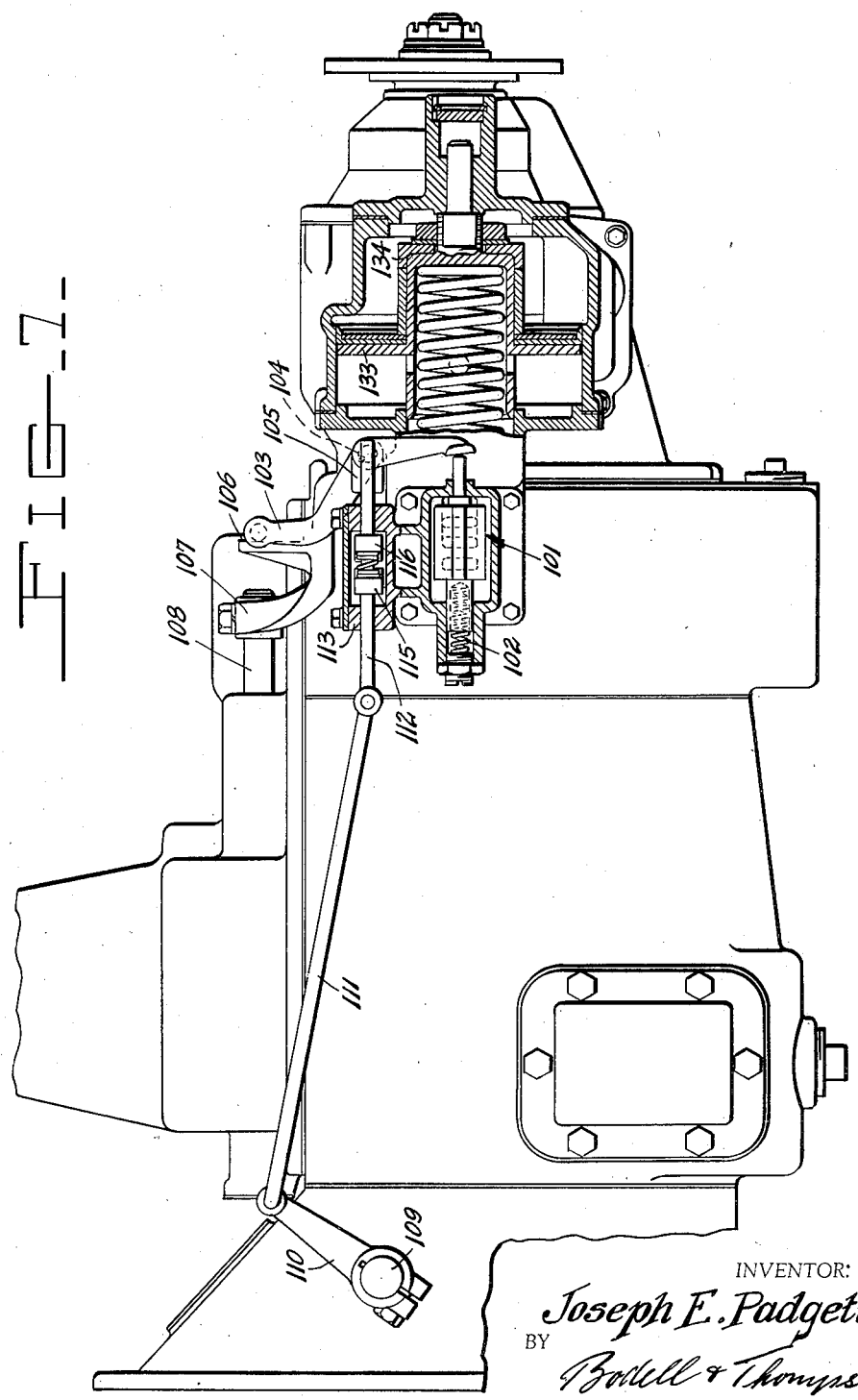

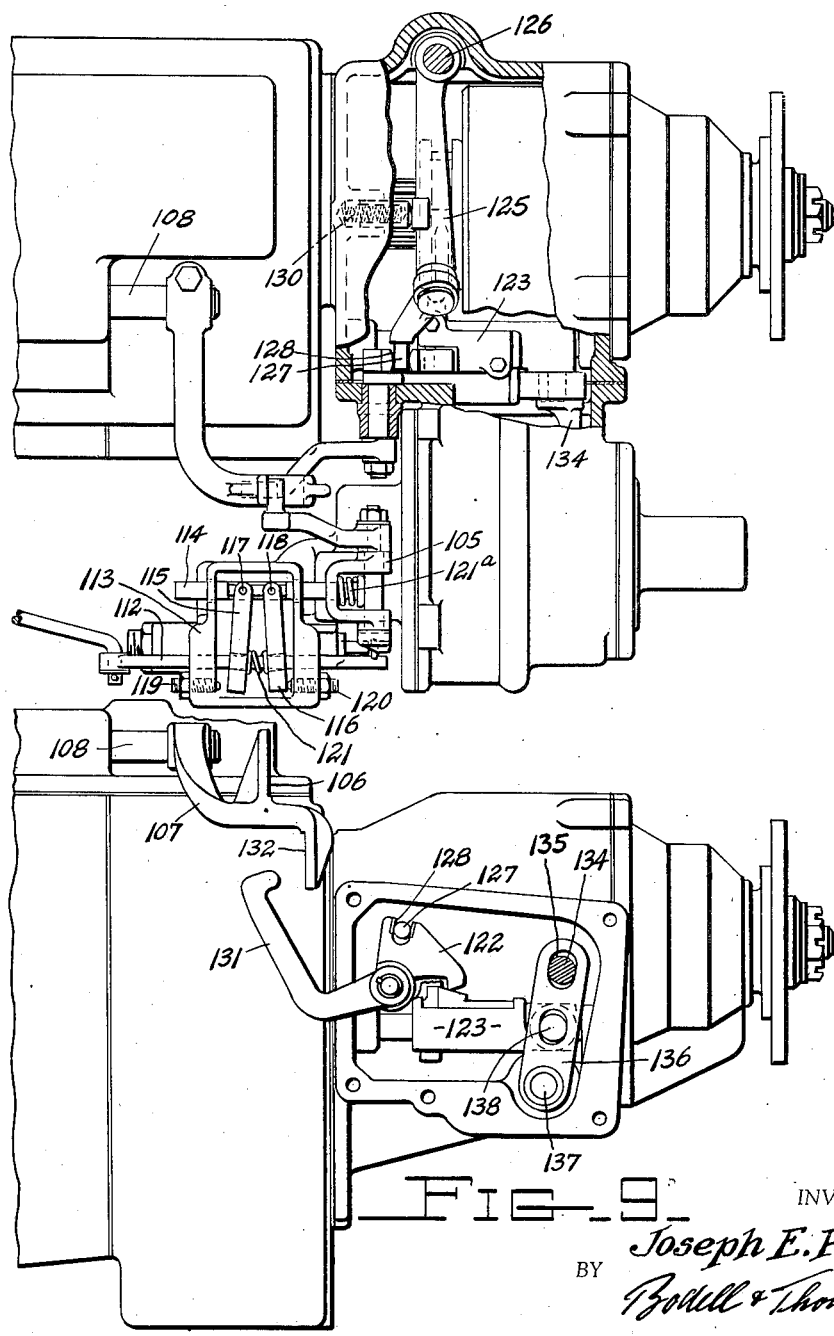

Patented Sept. 17, 1935

2,014,632

UNITED STATES PATENT OFFICE 2,014,632

SYNCHRONIZING CLUTCH FOR TRANSMISSION GEARS

Joseph E. Padgett, Toledo, Ohio, assignor to Spicer Manufacturing Corporation, Toledo, Ohio, a corporation of Virginia Application September 27, 1932, Serial No. 635,063

16 Claims. (Cl. 192—48)

This invention relates to change-speed transmission gears, such as are used in motor vehicles and has for its object a synchronizing clutch wherein the synchronizing is effected by speeding up one of the clutch sections to the speed of the other, before the clutch sections are re-engaged, in contradistinction to synchronizing by friction clutches or applying a braking force to the faster running clutch section to reduce the speed thereof to the speed of the other clutch section or effect preliminary synchronizing by driving through friction clutches prior to the engagement of the toothed clutch faces of the clutch sections.

It further has for its object a synchronizing means for clutches embodying an over-running clutch, and means, as a latch, operated by the over-running clutch, when the speed of the slower section increases to the speed of the faster section, which latch normally holds the clutch sections from re-engagement by means, as a spring, tending to re-engage them.

It further has for its object a particularly simple and efficient assembly of the clutch sections, over-running clutch and the re-engagement means controlled by the over-running clutch.

It further has for its object a particularly simple and efficient means for controlling the throwing out and the re-engagement of the synchronizing clutch.

Another object is the operation of the synchronizing clutch by power and controlled by some part usually operated during gear shifting operations, as for example the operation of the main clutch lever of the motor vehicle.

It further has for its object a construction by which the over-running clutch and the latch for delaying the re-engagement of the clutch sections is rendered ineffective, when the transmission gearing is shifted into reverse gear.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figure 1 is a side elevation, partly in section, of a transmission gearing embodying this invention.

Figure 2 is a rear elevation looking to the left in Figure 1, certain parts being shown in section.

Figure 3 is an enlarged sectional view through the synchronizing clutch, taken on line 3—3, Figure 2.

Figure 4 is a detail view of the latch mechanism for holding the shiftable section of the synchronizing clutch in its "out" or "disengaged" position.

Figure 7 is a view, similar to Figure 1, illustrating a more compact construction of the mechanism controlling the operation of the synchronizing clutch.

Figure 8 is a fragmentary plan view, partly in section, illustrating the throw-out mechanism for the rear clutch shown in Figure 7.

Figure 9 is an elevation of parts seen in Figure 8, similar to Figure 4.

Figure 5:
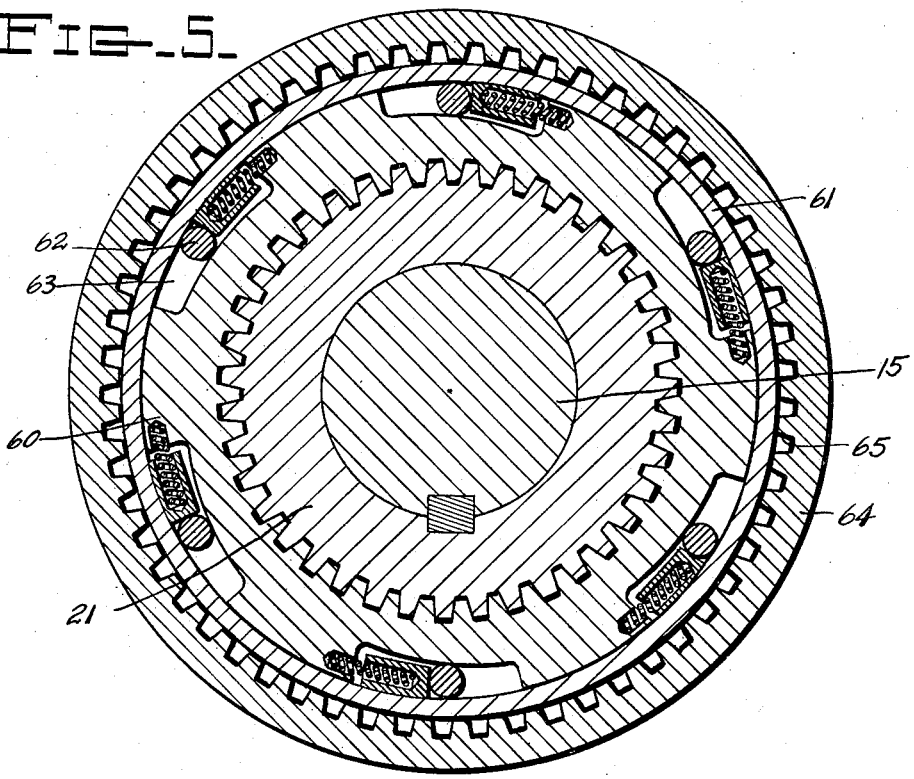
Figure 5 is a detail view of the over-running clutch, taken on line 5—5, Figure 3.
Figure 6:
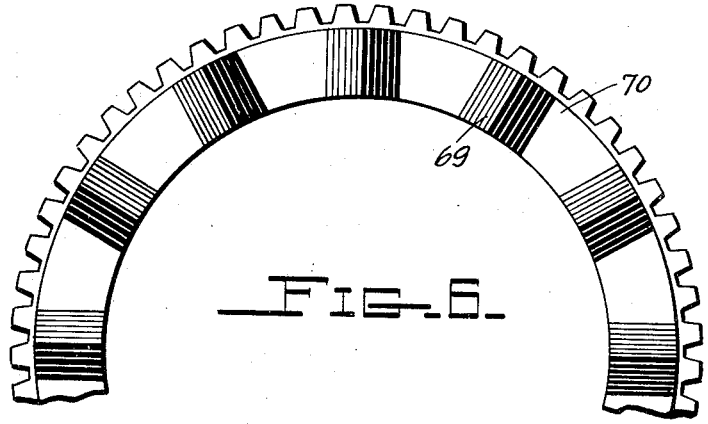
Figure 6 is a detail view of one of the cams operated by the over-running clutch for operating the latch.

11 designates the gear box of a change-speed transmission gearing, which includes the usual driving and driven or transmission shafts arranged in axial alinement and a countershaft with change-speed gearing between the shafts including shiftable elements, which are operated to produce a plurality of speeds forward and a reverse by a selecting and gear shifting lever 12, the various shiftings being effected through shift rods in the well known manner.

13 designates the reverse shift rod which is connected to shiftable gear elements to produce reverse drive.

14 and 15 designate respectively driving and driven transmission shafts, the transmission shaft extending through the rear wall of the gear box (as seen in Figure 3) where it is connected through a rear clutch to a driven shaft 16 which is connected to the propeller shaft of the vehicle. This rear clutch is mounted in a housing 17 supported on the rear wall of the gear box 11. The rear clutch is provided with a synchronizing mechanism forming the subject matter of this invention.

18 designates the housing for the main clutch which includes a shiftable element operated by the regular clutch pedal of the motor vehicle, the throw-out mechanism including a throw-out yoke 19, which acts on the throw-out collar 20 connected to the shiftable clutch section.

The construction of the main clutch forms no part of this invention.

The rear clutch or synchronizing clutch comprises two sections 21 and 22 mounted respectively on the shafts 15 and 16, the section 21 having external clutch teeth 23 for coacting with internal clutch teeth 24 provided on the section 22. The section 21 is shiftable axially to disengage and re-engage the clutch teeth. The synchronizing means between these clutch sections to synchronize them before the teeth 23, 24 are engaged, operates on the new method or principle of speeding up the clutch section 21 until it at least equals the speed of the driven clutch section 22, which is being driven by the momentum of the vehicle, before the clutch section 21 is shifted to bring its teeth 23 into interlocking engagement with the teeth 24 of the driven clutch section 22, in contradistinction to applying a braking force to the section 22 by means of a friction clutch operated by the section 21, and synchronizing the clutch sections by reducing the speed of the faster or driven clutch section by braking it down to the speed of the other clutch section 21. The braking force here considered is braking force applied directly to the clutch section and not any braking force indirectly applied thereto, as when the brakes of the vehicle are applied to the rear wheels, and hence would tend to slow the propeller shaft and the clutch section 22.

This method of synchronizing by speeding up the driving clutch section 21 to the speed of the driven clutch section 22 is effected through an over-running clutch which permits the clutch section 22 to over-run relative to the clutch section 21, when the clutch sections 21, 22 are disengaged, and means operated by the over-running clutch when the speed of the section 21 is equal to or slightly exceeds the speed of the section 22 for releasing the holding means or latch device which is holding the section 21 from being shifted into its "in" position, by means, as a spring. The over-running clutch and latch tripping means operated thereby will be described after the operating means for the clutch section 21 has been described.

The clutch section 21 is operated by a fork 25 working in a groove 26 in the hub of the section 21 and carried by a hub 27 (Figure 3) slidable along a guide rod 28 mounted in the casing 17, this hub 27 being connected through suitable mechanism, including an arm 29 to a piston 30 movable in a cylinder 31 against the action of a returning spring 32. The cylinder is connected to any suitable source of power, as the vacuum in the intake manifold of the engine, through a pipe 33 and the vacuum is controlled by a normally closed valve 34 which is operated to its "open" position, when the main clutch pedal or throw-out yoke 19 is operated.

The valve 34 is here shown as a slide valve mounted on a rod 40 and working in a suitable guide passage 41 and is spring-pressed by a spring 42. The valve 34 is provided with a passage 43 for connecting passages 44 and 45 together, or connecting the passage 45 to the outer air. The passage 45 communicates with the cylinder 31 in which the piston 30 operates. In operation, when the valve is shifted upwardly from its position shown in Figure 1, the piston 30 is connected or subject to the vacuum in the intake manifold of the engine through the passages 45, 43, 44 and pipe 33 so that the piston 30 is pulled to the left, against the action of the spring 32, and shifts through the arm 29, and fork 25, the clutch section 21 to the left to disengage the teeth 23 from the internal teeth 24 of the section 22. When the valve is released, it is pressed downwardly into the position shown in Figure 1 by the spring 42 until its passage 43 connects the passage 45 to the cylinder with the outer air permitting the outer air to enter and break the vacuum in the cylinder 31, and hence permit the spring 32 to react to re-engage the clutch section 21 with the section 22, the re-engagement being delayed however by the latch mechanism to be presently described. The valve 34 is held from displacement during its sliding movement by a spring 34ª.

The rod 40 of the valve 34 is operated from the main clutch pedal through a link 50 connected at 51 (Figure 1) to an arm 52 on the throw-out yoke 19 and connected at its rear end to a lever 53 which is connected by a link 54 to one arm of an angle lever 55, the other arm of which presses against the stem or rod 40 of the valve 34. The link 50 is composed of two sections connected together by lost motion means including a spring 56 which is for the purpose of permitting one section of the link 50 to move, when the clutch pedal continues to be depressed after the lever 55 moves with valve 34 to its full extent. The lever 53 is pivoted at one end at 57 to a bracket on the reverse shift rod 13. When the clutch pedal is being depressed, the lever 53 moves about the pivot 57 connecting it with said reverse shift rod 13, but when the shift rod 13 is operated, this lever 53 moves about the pivot 58 connecting it with the link 50 to shift the valve operating arm of the angle lever 55 downwardly or to shift it away from the rod 40 of the valve 34 for a purpose to be presently described.

Returning to the description of the synchronizing clutch, and particularly the over-running feature thereof, this over-running clutch is here shown as a roller clutch including opposing, here shown as inner and outer, members or rings 60, 61 rotatable with the clutch sections 21, 22 respectively and one-way clutch devices as rollers 62 between the rings, the inner member 60 having internal teeth for coacting with the external teeth 23 of the section 21 and the outer member being frictionally engaged with a part rotatable with the clutch section 22. The rollers 62 are located in recesses 63 in the inner ring 60. The outer ring 61 is provided with a suitable annular recess for receiving the inner member 60 and both the inner and outer members 60 and 61 thrust against the end face of the section 22 outside of the internal teeth 24. The outer clutch section 22 is enclosed in a drum 64 which is splined or keyed thereto at 65 and shiftable axially thereof against the action of springs 66 located in suitable sockets formed in clutch section 22 and opening through the rear face thereof, the springs thrusting against the bottoms of the recesses and against a head 67 of the drum. The outer ring 61 is provided on one end face thereof with cam means, as cam teeth 68 which coact with complemental cam means 69 provided on a ring 70 within the drum 64 and provided with external teeth interlocked with the internal teeth or splines of the drum 64. The ring 70 thrusts against abutment 71 at the outer end of the drum. The cams 68, 69 normally frictionally or impositively lock the outer ring 61 of the over-running clutch to the section 22 on the drum 64, so that the outer ring 61 normally rotates with the section 22. Assuming that the clutch section 21 has been shifted out of engagement with the clutch section 22 and a gear shift made, the shaft 15 and the clutch section 21 will rotate and pick up speed relatively to the shaft 16 and the clutch section 22, which are rotating faster under the momentum of the vehicle than the shaft 15 and the clutch section 21 and over-running by reason of the over-running clutch consisting of the members 60, 61 and rollers 62. As the shaft 15 and section 21 pick up speed and the speed equals the rotation of the clutch section 22 and its shaft 16, and increases slightly beyond such speed, the outer ring or member 61 will be rotated sufficiently to cause the cams 68 and 69 to coact, forcing the drum 64 to move against the action of the returning springs 66, thus tripping the latch, which is holding the clutch section 21 from shifting inwardly by the spring 32 acting on the piston 30, and permitting the spring 32 to react and shift the clutch section 21 to engage its external teeth 23 with the internal teeth 24 of the clutch section 22. Some of these teeth may be cut back so as to be shorter than others, in order to let the longer teeth first overlap or engage and line up the teeth of the one clutch with the spaces between the teeth of the other as in the pending application of Carl D. Peterson Ser. No. 647,917 filed December 19, 1932.

75 designates the latch (Figure 4) which is here shown as pivotally mounted at 76 to the casing 17 and as coacting with the shoulder 77 on the hub 27 of the shifting fork 25, the latch being acted upon by a spring 78. When the clutch section 21 is disengaged by reason of the shifting of the hub 27, the latch 75 snaps into engagement with the shoulder 77, as shown in dot and dash lines in Figure 4, and thus locks the clutch section 21 in its "out" position. After the valve 34 has been moved to its original position to cut off the vacuum by the return of the main clutch pedal to its normal position, the shifting of the drum 64 by reason of the over-running clutch and the cams 68, 69 is transmitted to the latch to trip it by any suitable mechanism. The mechanism is here shown as a lever 80 (Figure 3) having a hub 81 mounted on an upright rock shaft 82 journalled in the casing 17, the lever being bifurcated with its arms arcuate and embracing, or extending on opposite sides of, the clutch section 21 and provided with shoulders 83 against which the cam ring 70 thrusts, the shoulders 83 being located diametrically opposite each other. One of the arms 80 is provided with an extension 84 for coacting with the latch 75 and having a bearing as a ball 85 at its end working in a notch 86 (Figure 4) in the latch. Thus, when the clutch sections 21 and 22 have been synchronized by reason of the clutch section 21 increasing the speed up to and slightly beyond the speed of the clutch section 22, the latch 75 will be tripped permitting the spring 32 to react and shift the clutch section 21 to the right into engagement with the clutch section 22.

During shifting into reverse gear synchronizing is not necessary, as when this is done, the vehicle is usually standing still, and furthermore, as the clutch section 22 over-runs the clutch section 21 only in one direction, synchronizing during reverse gear or during the rotation of the shaft 15 in the reverse direction could not take place without using a double over-running clutch operative in opposite directions. Therefore, during shifting into reverse, the latch 75 must be rendered inoperative. In the illustrated embodiment of my invention, the latch 75 is rendered inoperative by the operation of the reverse shift rod 13.

The connections between the reverse shift rod 13 and the latch are here shown as a lever 90 mounted on the rock shaft 82 and extending horizontally across the casing 17 and connected to a bracket 91 fixed to the reverse shift rod 13. This lever 90 is not directly connected to said bracket but has an eye 92 at its end through which a rod 93 passes, the rod 93 being connected to the bracket to move therewith, when the shift rod is operated. The rod 93 is provided with a shoulder 94 at its end, which is normally spaced from the eye 92. When the reverse shift rod 13 is shifted, it shifts forwardly to the left (Figure 1) and in so doing, the shoulder 94 takes up the lost motion between it and the eye 92 thus moving the lever 90 forwardly, rocking the shaft 82 and lever 80 thereon to the left (Figure 3), and moving the latch out of its operative position, so that it cannot hold the hub 27 of the shifting fork 25 from being shifted by the spring 32 when the vacuum in the cylinder 31 is broken.

The lever 53 is also pivoted to the bracket 91 so that when the reverse shift rod 13 is shifted, it will carry the pivot point 57 of the lever 53 forwardly, the lever 53 fulcruming about the pivot 58 of the rod 50, so that its lower end moves to the right (Figure 1), thus actuating the angle lever 55 away from the stem 40 of the valve 34. This movement of the shift rod therefore not only moves the latch 75 out of operative position, but also, breaks the vacuum in the cylinder 31 so that the spring 32 is free to react, even though the main clutch pedal is held depressed. The gear set is preferably provided with the usual inertia brake operable to stop the rotation of the drive shaft and gears in the gear box when the main clutch is thrown out so that when the main clutch, as the rear clutch, consisting of the sections 21, 22 are disengaged by the throwing out of the main clutch, the gears in the gear box are slowed down by the inertia brake preliminarily to gear shifting operations. The inertia brake may, insofar as this invention is concerned, be of any suitable form, size and construction.

In operation, assuming a gear shift is to be made from one forward speed to another, the operator first depresses the clutch pedal to throw out the main clutch, this operation rocking the throw-out yoke 19, which pulls the rod 50 forwardly, moving the lever 53 about the axis 57 so that the lower end of the lever 53 is moved forwardly or to the left (Figure 1), and thus actuates the angle lever 55 to open the valve 34 to the vacuum in the engine manifold, which becomes effective upon the piston 30, thus actuating the piston to the left (Figure 1) and through the arm 29, and shifting fork 25 disengaging the clutch section 21 from the clutch section 22. Immediately, upon disengagement, the latch 75 is snapped into engagement with the shoulder 77 by the spring 78, thus locking out the clutch section 21. The gear shift is then made, and the main clutch released, so that the transmission shaft 15 and driving clutch section 21 rotate. During the time that this clutch is out, the clutch section 22 is rotated by reason of the movement or coasting of the vehicle and is over-running the clutch section 21. However, when the main clutch is re-engaged, after the gear shifting operation, the shaft 15 and clutch section 21 pick up speed and when the section 21 attains the speed of the clutch section 22 and goes slightly beyond said speed, the over-running clutch through the cams 68, 69 operates the lever 80 to release the latch, whereupon the clutch section 21 is actuated into engagement with the clutch section 22 by the spring 32 acting on the piston 30. As both the clutch sections have been synchronized by reason of the section 21 being rotated up to the speed of the clutch section 22, the teeth of the clutch sections engage while both are running at the same speed.

When the shift is made into reverse gear, the clutch pedal is operated the same as before and the rear clutch thrown out by the vacuum as before, but when the gear shifting lever is operated to shift the reverse shift rod 13, the upper end of the lever 53 is carried forwardly, so that the lever fulcrums about the point 58 and its lower end moves rearwardly, thus operating the angle lever 55 to permit the valve 34 to close or cut off the vacuum and open the cylinder 31, to the outer air, so that the spring 32 is free to react. At the same time, this movement of the reverse shift rod 13 operates the lever 90 forwardly or to the left (Figure 1) thus rocking the latch trip lever 80 to trip the latch so that there is nothing preventing the immediate return of the clutch section 21 into engagement with the clutch section 22. As during shifts into reverse gear the vehicle is idle, no synchronizing is necessary.

In Figures 7, 8, and 9, I have illustrated my invention as embodied in a more compact and commercial form, although the principle and the mechanism is practically the same.

In the construction shown in Figure 7, the rear clutch throw out mechanism is a unitary self contained structure which can be assembled to the gear box, as a unit, and no parts, such as the vacuum valve operating lever 55, Figure 1, are mounted on the main gear box 11, and also the connections operated by the reverse shift rod are physically different, although the principle is the same. Also, the motion of the piston 30 of the vacuum cylinder is transmitted to the shifter for the rear clutch through reducing mechanism instead of being directly connected thereto through an arm 29. A more important feature is means by which the motion of the main clutch throw-out mechanism is transmitted to the valve to immediately open it upon a small initial movement of the main clutch throw-out mechanism and to immediately close it upon a small retrograde movement of the main clutch throw-out mechanism from its extreme off position.

101 designates generally the vacuum valve corresponding to the valve 34, this being located in horizontal position and acted upon by a returning spring 102.

103 designates the differential lever corresponding to the lever 53, this being pivoted at 104 to a sliding block or carriage 105 shiftable forwardly and rearwardly. One arm of the lever coacts with the stem of the valve 101, and the other with an abutment 106 on a bracket 107 carried by the reverse shift rod 108. The throw out shaft 109 of the main clutch is connected to the lever 103 to shift it through an arm 110 on the shaft 109, a link 111 connecting said arm to a sliding part or rod 112 suitably guided in a housing 113 which is part of the housing for the unitary structure of the rear clutch, a second sliding part or rod 114 which is connected to some part as a valve to be operated, and a clutch device between the rods operating to shift the rod 114 to operate the valve upon the initial movement of the rod 112 by the main clutch throw-out mechanism, and to declutch permitting further movement of the rod 112 relative to the rod 114 after the valve is operated either to open, or to closed position. The lever 103 is arranged in vertical position and the upper end thereof normally fulcrums on the abutment 106. When the main clutch pedal is depressed, the lever moves about its bearing on the fulcrum 106 and the lower end of the lever opens the vacuum valve 101. The pivotal connection of the lever or the block 105 slides during this movement.

The clutch device between the rods 112, 114, as here shown operates automatically to clutch the rod 112 to the rod 114 to immediately open the valve and then to automatically unclutch it to permit further movement of the clutch pedal, the arm 110, link 111, and rod 112, without transferring movement to the rod 114. The clutch device also operates the same on the retrograde movement of the clutch pedal to clutch the rod 114 to the rod 112 during the initial part of the retrograde movement of the pedal from its full off position and thereafter permit continued movement after the vacuum valve 101 has seated.

As seen in Figure 8, this clutch device consists of levers 115, 116, pivoted at 117 and 118 to the rod 114 and having perforations at their ends slidably fitting the rod 112 when located at substantially a right angle to the rod and binding on the rod 112 when at an inclined angle. They are normally arranged at an inclined angle in order to be in binding contact, and means are provided for limiting their movement with the rod 112 causing them to straighten to right angular position, so that the rod 112 can slide relatively thereto. The lever 115 is for clutching the rods 112 and 114 together during the forward throwing out movement of the clutch pedal and the other lever 116 for clutching the rods 112 and 114 during retrograde movement of the clutch pedal.

Referring to Figure 8, upon depression of the foot pedal to throw out the main clutch, the rod 112 will be pulled forwardly and likewise through the clutch lever 115, the rod 114, which operates the lever 103, will be pulled forwardly, thus opening the valve 101. Upon the additional throwing out movement of the clutch pedal, the free end of the lever 115 engages a suitable adjustable stop 119 which, during movement of the rod 112, causes the clutch lever 115 to assume a right angular relationship to the rod 112 permitting the rod 112 to slide therethrough without transmitting motion to the rod 114. The friction between the rod 112 and the lever 115 prevents the return of the valve 101 to closed position by its returning spring 102. The lever 116 coacts with a similar stop 120 during retrograde movement of the clutch pedal and rod 112 and thus permits retrograde movement of the rod 112 relatively to the rod 114, after the valve 101 is seated. The levers 115, 116 are normally arranged at slight inclines in opposite directions, as shown, and are pressed by a suitable spring 121. Thus during forward movement of the rod 112, the lever 116 will be moved to a right angular relation to the rod 112, while the lever 115 is being moved into a right angular relation by reason of its engagement with the stop 119 and during retrograde movement, after the lever 115 is moved away from the stop 119, the lever 115 will be moved again into right angular relation to the rod 112, while the clutch lever 116 is being shifted to a right angular position by reason of its engagement with the stop 120. The rod 114 is connected to the block 105 through a suitable spring 121ª. The two way clutch device including the levers 115, 116, per se, forms no part of my invention, but is the invention of Carl Peterson of Toledo, Ohio, and forms the subject matter of Patent No. 1,916,893, issued July 4, 1933.

122 designates the latch corresponding to the latch 75 coacting with the shifter 123 corresponding to the shifter 27 (Figure 4). This latch operates the same as in the construction shown in Figures 3 and 4 to lock the shifter 123 in its "out" position where it has been shifted by the action of the vacuum cylinder, but the latch is tripped by the action of the overrunning synchronizing clutch by a slightly different mechanism, and also the connections between it and the reverse shift rod 108 to trip the latch, when the reverse shift rod is operated, are slightly different. The latch 122 is unlatched by an arm 125 similar to the arm 84 and mounted on a rock shaft 126 similar to the rock shaft 82, but the arm 125 is a single arm or not bifurcated, and has a pin 127 at its end working in a slot 128 in the latch, the pin 127 being an ordinary pin and the slot having a convex side, instead of the arm having a ball, as the ball 85 working in the slot. The arm 125 is acted directly upon by a returning spring 130, performing the function of the spring 78, which in Figure 4 acts directly upon the latch. The arm 125 acts to trip the latch 122 the same as the arm 84 acts to trip the latch 75.

The connections between the latch 122 and the reverse shift rod 108 are here shown as a rock arm 131 mounted coaxially with the latch 122 and having an angular arm extending upward into the path of an abutment 132 carried by the bracket 107 on the reverse shift rod 108. The arm 131 is normally spaced from the abutment 132. However, upon shifting of the reverse shift rod 108 from its normal position, that is, forwardly, the abutment 132 will engage the arm 131 and trip the latch.

During the reverse gear shifting operation, the driver depresses the foot pedal to throw out the main clutch and therefore, through the rods 112 and 114 and lever 103, opens the vacuum valve 101 which causes the rear clutch to be thrown out. However, as before described, during the reverse movement the synchronizing or over-running clutch, or the over-running feature thereof, is not utilized because of the reverse rotation of the clutch. Therefore, as soon as the reverse shift rod 108 is shifted forwardly, the abutment 132 trips the latch 122 permitting the synchronizing clutch immediately to reengage and at the same time, the abutment 106 moves away from the upper end of the lever 103 so that now that this lever 103 has no fulcrum point, the spring 102 of the vacuum valve reacts and immediately closes the valve.

The connections between the piston 133 of the vacuum cylinder and the shifter 123 includes an arm 134 corresponding to the arm 29 (Figure 2) but this arm instead of being connected directly to the shifter 123 coacts at 135 with a lever 136 pivoted at 137 to the housing for the rear clutch and also pivoted by a pin and slot connection 138, or its equivalent, to the shifter 123. Thus the piston 133 is connected through a reduction leverage to the shifter 123, and hence a smaller cylinder and piston can be used than when a direct connection is used to throw out the rear clutch.

What I claim is:

1. In a clutch, the combination of coacting driving and driven toothed clutch sections having relative axial shifting movement into and out of engagement, means for shifting the shiftable section including means tending to re-engage the sections, and means located external of the clutch sections and non-rotatable therewith for delaying the re-engagement of the sections until one section has increased to the speed of the other section including an over-running clutch interposed between the sections permitting the driven section to over-run when the sections are disengaged, and means operated by the over-running clutch to release the delaying means.

2. In a clutch, the combination of coacting driving and driven toothed clutch sections having relative axial shifting movement into and out of engagement, means for shifting the shiftable section including means tending to re-engage the sections and means located external of the clutch sections and non-rotatable therewith for delaying the re-engagement of the sections until the driving section has increased to the speed of the driven section including an over-running clutch interposed between the sections permitting the driven section to over-run when the sections are disengaged, a latch device for holding the clutches disengaged, and means operated by the over-running clutch to trip the latter, when the driving section attains the speed of the driven clutch section.

3. In a clutch, the combination of coacting toothed clutch driving and driven sections having relative axial shifting movement into and out of engagement including means which when free to act shifts the shiftable clutch section into engagement with the other section, a latch located external of the clutch sections and non-rotatable therewith operating to hold the shiftable section in its disengaged position, and means operated by the driving clutch section for tripping the latch when the driving clutch section attains the speed of the other section, the last-mentioned means comprising an over-running clutch between and concentric with the toothed clutch sections and permitting over-running of the driven section relatively to the driving, and including sections rotatable respectively by the driving and driven toothed sections, and a latch trip device operable by the movement of the section of the over-running clutch rotatable with the driving toothed clutch section, when the speed of rotation of the driving section is at least equal to the speed of the driven clutch section and the over-running clutch section rotatable therewith.

4. In a clutch, the combination of driving and driven shafts arranged in axial alinement, clutch sections mounted on and rotatable respectively with said shafts, said clutch sections being provided with coacting toothed clutch faces, an over-running clutch interposed between the sections and operable to permit over-running of the driven section relative to the driving section before the toothed faces are engaged and including opposing rings rotatable with the sections respectively, and a wedge member between said rings, the ring rotatable with the driven section being also rotatable relative thereto after the speed of the sections become equal, before the toothed faces are engaged, means tending to re-engage the sections, means located external of the clutch sections and non-rotatable therewith for normally holding the sections from re-engagement, and means operated by the relative rotation of the ring of the over-running clutch ahead of the driven member for releasing the holding means.

5. In a clutch, the combination of driving and driven shafts arranged in axial alinement, toothed clutch sections mounted on and rotatable respectively with said shafts, said clutch sections being provided with coacting clutch teeth, an over-running clutch interposed between the sections and operable to permit over-running of the driven section relative to the driving section before the clutch teeth are engaged and acceleration of the driving section relative to the driven, means located externally of the clutch sections and non-rotatable therewith for holding the clutch sections from engagement during the over-running of the driven section relative to the driving, and means operated by the over-running clutch to release the holding means when the driving section attains a speed equal, or slightly greater than the driven section.

6. In a clutch, the combination of driving and driven shafts arranged in axial alinement, coacting clutch sections mounted on and rotatable respectively with said shafts, said clutch sections being provided with coacting clutch teeth, one section being shiftable axially into and out of engagement with the other, means tending to shift the shiftable section into engagement with the other, a drum enclosing one section and rotatable therewith and slidable axially thereof, and spring means interposed between the drum and its companion section tending to move it in one direction, an over-running clutch within the drum and thrusting against the outer clutch section and including opposing rings, and one-way motion transmitting parts between them, the one ring being rotatable with the inner clutch section, the other ring of the over-running clutch being formed with a cam and an additional ring within the drum and rotatable therewith and having a cam coacting with and complemental to the former cam, a latch for holding the shiftable clutch member in its disengaged position, and means operated by the relative rotation of the cams for releasing the latch.

7. In a clutch, the combination of driving and driven shafts arranged in axial alinement, clutch sections mounted on and rotatable respectively with said shafts, and provided with coacting clutch teeth, one section being shiftable axially into and out of engagement with the other, and means tending to shift the shiftable section into engaged position, an over-running clutch between the sections operable to permit over-running of the driven section relative to the driving when the clutch faces of the sections are disengaged, a latch normally holding the shiftable section in its "out" position, the over-running clutch including two members and one-way clutch devices between them rotatable respectively with the clutch sections, friction means connecting one of the over-running clutch members and the driven clutch section, and cam means operated by the relative rotation of the latter member and the section with which it is frictionally engaged, when the speed of the slower running shaft increases to and beyond the speed of the faster running shaft and connections operated by said cam means for tripping the latch.

8. In a transmission mechanism, the combination of a gear set including driving and transmission shafts and gear shifting means including reverse gear mechanism, main clutch throw-out mechanism, a driven shaft, a rear clutch connecting the transmission shaft and the driven shaft and including sections mounted on one of said shafts having coacting toothed clutch faces, one section being shiftable axially into and out of engagement with the other, and synchronizing means between the clutch sections, a latch for holding the shiftable section in its "out" position, throw-out means for the shiftable section, means tending to shift the shiftable section into engaged position, means operated by the synchronizing means for tripping the latch, when the clutch sections are synchronized, and means operated by the reverse gear shifting mechanism for shifting the latch out of position to hold the shiftable clutch section in its "out" position when said reverse gear shifting mechanism is operated.

9. In a transmission mechanism, the combination with a gear set including driving and transmission shafts and gear shifting mechanism, main clutch throw-out mechanism, a driven shaft, a rear clutch connecting the transmission shaft and the driven shaft and including sections mounted respectively on said shafts and having coacting toothed clutch faces, one section being shiftable axially into and out of engagement with the other; of an over-running synchronizing clutch between the clutch sections, means tending to shift the shiftable section into engagement with the other section, a latch located external of said clutch sections for holding the shiftable section in its disengaged position, throw-out means for the shiftable section, means operated by the over-running clutch when the driving clutch section attains the speed of the driven for tripping the latch, and means controlled by one of said mechanisms for operating the rear clutch throw-out means, whereby the rear clutch is thrown out upon the operation of said one of said mechanisms.

10. In a transmission mechanism, the combination with a gear set including driving and tansmission shafts and gear shifting means including a reverse gear mechanism, main clutch throw-out mechanism, a driven shaft, a rear clutch connecting the transmission shaft and the driven shaft and including sections mounted respectively on said shafts and having coacting toothed clutch faces, one section being shiftable axially into and out of engagement with the other; of an over-running synchronizing clutch between the clutch sections, means tending to shift the shiftable section into engagement with the other section, a latch for holding the shiftable section in its disengaged position, throw-out means for the shiftable section, means operated by the over-running clutch when the driving clutch section attains the speed of the driven for tripping the latch, and means controlled by the main clutch throw-out mechanism for operating the rear clutch throw-out means, whereby the rear clutch is thrown out upon the operation of the main clutch throw-out mechanism, and connections between the reverse gear mechanism and the latch for shifting the latch out of operative position when the reverse gear mechanism is operated.

11. In a transmission mechanism, the combination with a gear set including driving and transmission shafts and gear shifting means including a reverse gear mechanism, main clutch throw-out mechanism, a driven shaft, a rear clutch connecting the transmission shaft and the driven shaft and including sections mounted respectively on said shafts and having coacting toothed clutch faces, one section being shiftable axially into and out of engagement with the other; of an overrunning synchronizing clutch between the clutch sections, means tending to shift the shiftable section into engagement with the other section, a latch for holding the shiftable section in its disengaged position, throw-out means for the shiftable section, means operated by the over-running clutch when the driving clutch section attains the speed of the driven for tripping the latch, and means controlled by the main clutch throw-out mechanism for operating the rear clutch throw-out means, whereby the rear clutch is thrown out upon the operation of the main clutch throw-out mechanism, and connections between the reverse gear mechanism and the latch for shifting the latch out of operative position when the reverse gear mechanism is operated, and means operated by the reverse gear mechanism for shifting said connections out of its operative relation to the rear clutch throw-out mechanism.

12. In a transmission mechanism, the combination with a gear set including driving and transmission shafts, a gear shifting means including reverse gear shifting mechanism, main clutch throw-out mechanism, a driven shaft, a rear clutch connecting the transmission and driven shafts and including sections mounted respectively on said shafts and having coacting toothed clutch faces, one section being shiftable axially into and out of engagement with the other; of synchronizing means between the clutch sections including an over-running clutch, throw-out means for the shiftable section, means acting to shift the shiftable section to re-engage the sections, a latch for holding the shiftable section in its "out" position, means operated by the over-running clutch, when the speed of the driving section attains the speed of the driven section for tripping the latch and connections between the reverse shift rod and the latch for moving it out of operative position, when the reverse shift rod is operated.

13. In a transmission mechanism, the combination with a gear set including driving and transmission shafts, a gear shifting means including a reverse gear shifting rod, main clutch throw-out mechanism, a driven shaft, a rear clutch connecting the transmission and driven shafts and including sections mounted respectively on said shafts and having coacting toothed clutch faces, one section being shiftable axially into and out of engagement with the other; of synchronizing means between the clutch sections including an over-running clutch, throw-out means for the shiftable section, means acting to shift the shiftable section to re-engage the sections, a latch for holding the shiftable section in its "out" position, means operated by the over-running clutch, when the speed of the driving section attains the speed of the driven section for tripping the latch, connections between the reverse shift rod and the latch for moving it out of operative position, when the reverse shift rod is operated, and means controlled by the main clutch throwout mechanism for operating the rear clutch throw-out mechanism, when the front throw-out mechanism is operated including a lever pivotally connected at one end to the reverse shift rod and shiftable by the reverse shift rod, a link connected to said lever between its ends and connections operated by the opposite end of the lever for operating the rear clutch throw-out means.

14. In a transmission mechanism, the combination of a gear set including driving and transmission shafts, gear shifting mechanism, a main clutch throw out mechanism, a driven shaft, a rear clutch connecting the transmission shaft and the driven shaft, throw out mechanism therefor, the gear shifting mechanism including a reverse shift member having an abutment, power operated means for operating the rear clutch throw out mechanism, a conduit for a motive fluid, a control valve therein, connections between the main clutch throw out mechanism and said valve including a lever pivoted between its ends coacting at one end with the valve and at its other end fulcruming on said abutment, the abutment being separable from said lever by the operation of the reverse gear shift member, thereby permitting the lever to idle during the operation of the main clutch throw out mechanism.

15. In a transmission mechanism, the combination of a gear set including driving and transmission shafts, gear shifting mechanism, a main clutch throw out mechanism, a driven shaft, a rear clutch connecting the transmission shaft and the driven shaft, throw out mechanism therefor, the gear shifting mechanism including a reverse shift member having an abutment, power operated means for operating the rear clutch throw out mechanism, a conduit for a motive fluid, a control valve therein, connections between the main clutch throw out mechanism and said valve including a lever pivoted between its ends coacting at one end with the valve and at its other end fulcruming on said abutment, the abutment being separable from said lever by the operation of the reverse gear shift member thereby permitting the lever to idle during the operation of the main clutch throw out mechanism, said lever being pivoted to a sliding carrier and said connections operating to slide the carrier, when the lever is engaged with the abutment.

16. In a transmission mechanism, the combination of a gear set including driving and transmission shafts, gear shifting mechanism, main clutch throw out mechanism, a driven shaft, a rear clutch connecting the transmission shaft and the driven shaft and throw out mechanism therefor, fluid operated means for operating the last mentioned throw out mechanism, a conduit for motive fluid and a control valve therein, and connections between the main clutch throw out mechanism and said valve including two motion transmitting parts, one operating the valve, and the other being connected to the main clutch throw out mechanism, a clutch device between said parts operating to normally clutch the parts together and means for releasing the clutch device when the valve operating part has moved sufficiently to open or close the valve.

JOSEPH E. PADGETT.